United States Patent
Govindarajapuram et al.

(10) Patent No.: US 7,320,123 B2
(45) Date of Patent: Jan. 15, 2008

(54) METHOD AND SYSTEM FOR DETECTING DEPRECATED ELEMENTS DURING RUNTIME

(75) Inventors: Shivakumar Govindarajapuram, Santa Clara, CA (US); Rajesh Kanungo, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 756 days.

(21) Appl. No.: 10/350,436

(22) Filed: Jan. 23, 2003

(65) Prior Publication Data

US 2003/0191864 A1    Oct. 9, 2003

Related U.S. Application Data

(60) Provisional application No. 60/369,379, filed on Apr. 1, 2002.

(51) Int. Cl.
*G06F 9/44* (2006.01)
*G06F 15/173* (2006.01)

(52) U.S. Cl. ...................... 717/124; 717/126; 709/225; 709/226

(58) Field of Classification Search ......... 717/127–161
See application file for complete search history.

(56) References Cited

U.S. PATENT DOCUMENTS

| | | | | |
|---|---|---|---|---|
| 6,138,238 A | * | 10/2000 | Scheifler et al. | 726/17 |
| 6,658,652 B1 | * | 12/2003 | Alexander et al. | 717/128 |
| 6,823,351 B1 | * | 11/2004 | Flood et al. | 707/206 |
| 6,941,552 B1 | * | 9/2005 | Beadle et al. | 718/1 |
| 2003/0101438 A1 | * | 5/2003 | Mishra et al. | 717/136 |

* cited by examiner

*Primary Examiner*—Chuck Kendall
(74) *Attorney, Agent, or Firm*—Martine Penilla & Gencarella, LLP

(57) ABSTRACT

A method for controlling access to deprecated methods of an implementation is provided. The method includes receiving a request to access a method that has been marked as deprecated and building a call stack for the request. Also included is inspecting the call stack to determine if the request is from an application outside of the implementation. The method further includes acting on the request in accordance with a control policy defined by a pluggable policy.

10 Claims, 12 Drawing Sheets

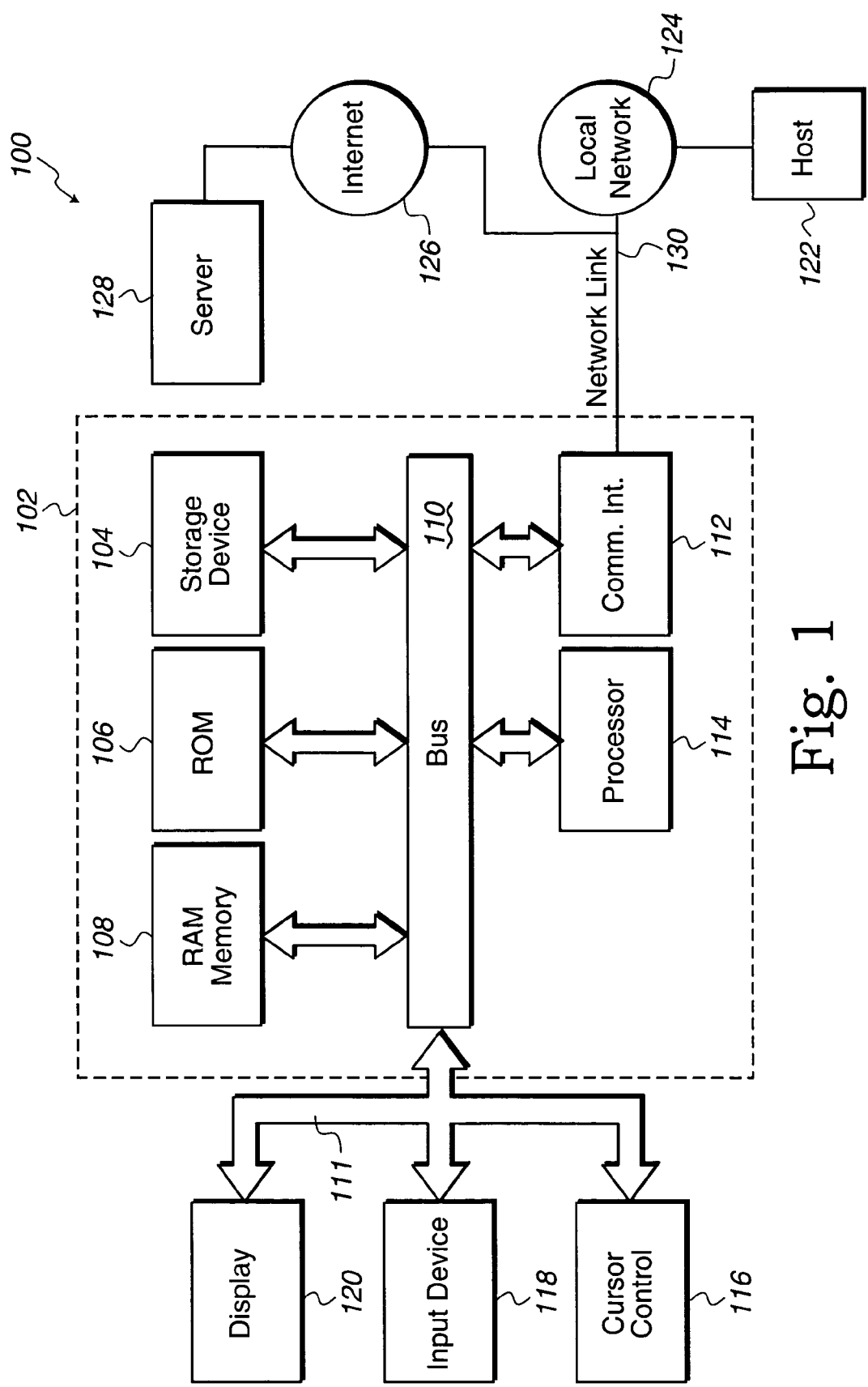

144-c''

| 3 | B | m2 | — 144d'' |
| 2 | C | Invoke ( ) | — 144c'' |
| 1 | < system > | < system method > | — 144b'' |
| 0 | main | main | — 144a'' |

| 4 | B | m2 | — 144e''' |
| 3 | < system > | < reflection method 2 > | — 144d''' |
| 2 | < system > | < reflection method 1 > | — 144c''' |
| 1 | A | m1 | — 144b''' |
| 0 | main | main | — 144a''' |

Fig. 4A-4

METHOD AND SYSTEM FOR DETECTING DEPRECATED ELEMENTS DURING RUNTIME

CROSS REFERENCE TO RELATED APPLICATIONS

This application claims priority from U.S. Provisional Patent Application No. 60/369,379 filed on Apr. 1, 2002 and entitled "Method and System for Detecting Deprecated Elements During Runtime," which is incorporated herein by reference in its entirety.

COPYRIGHT AUTHORIZATION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to software processing, and more particularly, to methods and systems for improving the detection of deprecated methods and classes implemented in computer software specifications.

2. Description of the Related Art

As the use of computer software in carrying out daily tasks has been increasing rapidly, so has the constant demand to enhance computer software performance. Consistently, computer programmers and software developers have been creating new software applications or modifying the existing software applications to arrive at a new version, hoping to eliminate all existing deficiencies.

At times, creating a new version of the software requires adding of new lines of source code, while in others certain portions of the source code are deprecated in the new version of the code. As used herein, "deprecate," means marking a portion of the source code as being no longer in use. By way of example, deprecating a portion of the source code may involve deprecating certain elements or attributes implemented in the software source code (e.g., a class, a method, a library, an object, an application programming interface ("API"), etc.) In such situation, the deprecated element or attribute is marked as such, by for example, including a comment in the source code, warning the programmers, developers, and users of the deprecated status of the element or attribute.

Ideally, software source code should not include any deprecated elements or attributes. That is, all elements and attributes marked as deprecated should be deleted. Although preferable, such solution is not feasible due to intricate internal dependencies of the elements and attributes in the software source code. For instance, deleting an element or attribute can render all internal elements and attributes dependent on the deprecated element nonfunctional.

As an alternative to deleting all deprecated methods, thus far, the deprecated elements and attributes or their use have been detected by compilers during the source code compilation. For instance, certain compilers have been designed to recognize and flag the deprecated elements and attributes thus warning the users of implementing a deprecated element or attribute. However, several problems can be associated with detection of deprecated elements and attributes during compile time.

First is the "legacy problem" wherein the source code is compiled using an old version of a library (a library in which the method has not been deprecated) and then is run on a newer version of the library (a library in which the method has been flagged deprecated). In such situation, the usage of the deprecated method during run time cannot be detected.

The second drawback is the "reflection problem" in which a method or a class is invoked during run time. An example of such problem is using of a "reflection method" in which a method or a class is invoked by name, using a string, during the running of a program. Class.forName(), Class.newInstance(), and Constuctor.newInstance() are exemplary methods which create new instances of objects, Method.invoke() is an exemplary method which invokes a method in an object dynamically at runtime.

Third, is the "inheritance problem" in which a child method is deprecated while the method in the parent class is not. In such situation, some programming languages, such as JAVA, allow the method that depends on the object type (e.g., parent or child class) to get invoked at runtime. This is referred to as polymorphism in Object Oriented terminology.

Next is the problem of "user carelessness" in which users choose to ignore compiler warnings regarding the calling of a deprecated method. Furthermore, except generating a simple warning, the compilers and conventional computer systems are incapable of restricting access to deprecated elements and attributes.

One solution would be to manually search through the source code to find all references to deprecated elements (e.g., classes and methods) and physically remove them from the source code. However, this manual search is extremely time consuming and cost prohibitive. Besides, merely eighty percent of such deprecated elements and attributes can be located and removed through manual search of the source code. This occurs as some programming languages such as JAVA, classes and methods can be created and invoked at runtime (e.g., getting a method name as a string from the user, calling the method on an object, etc.). Such methods and classes cannot be detected by examining the source code, since the method to be invoked and detected is not known till the program is executed.

In view of the foregoing, there is a need for a flexible methodology and system for improving the detection and controlling access to deprecated elements and attributes in software specifications.

SUMMARY OF THE INVENTION

Broadly speaking, the present invention fills these needs by detecting deprecated methods and classes during run time. In one example, upon detecting the access to deprecated methods or classes, an access controller uses a pluggable access control policy to determine whether a caller element should be allowed access to the deprecated method. The caller element is allowed access to the deprecated method if the caller element is determined to be an internal caller or have a domain that is identical to the domain of the deprecated method (i.e., a system caller). However, access to the deprecated method is denied when the caller element is determined to be an external caller or have a domain that differs from the domain of the deprecated method (i.e., non-system caller).

It should be appreciated that the present invention can be implemented in numerous ways, including as a process, an apparatus, a system, a device, or a method. Several inventive embodiments of the present invention are described below.

In one embodiment, a method for controlling access to deprecated methods of an implementation is disclosed. The method includes receiving a request to access a method that has been marked as deprecated and building a call stack for the request. The method also includes inspecting the call stack to determine if the request is from an application outside of the implementation. Further included in the method is denying access to the method if the request is determined to be from the application outside of the implementation upon the inspection.

In another embodiment, a method for controlling access to deprecated methods of an implementation is disclosed. The method includes receiving a request to access a method that has been marked as deprecated and building a call stack for the request. Also included is inspecting the call stack to determine if the request is from an application outside of the implementation. The method further includes acting on the request in accordance with an access control policy that is pluggable.

In yet another embodiment, a method for allowing access to a deprecated element of a software implementation is disclosed. The method includes invoking a deprecated element of the software implementation by a caller element. The method also includes invoking an access controller. The access controller includes a pluggable access control policy. Further included in the method is determining the accessibility of the deprecated element by the caller element using the pluggable access control policy. The determining includes granting access to the caller element if the caller element satisfies a criteria of the access control policy and denying access to the caller element if the caller element fails to satisfy the criteria of the access control policy.

In still another embodiment, a method for determining the accessibility of a caller element to a deprecated method of a software implementation is disclosed. The method includes invoking an access controller, which includes a pluggable access control policy configured to deny access to a caller element having a domain different than the domain of the software implementation. The method further includes limiting access to the deprecated method using the access control policy.

In still another embodiment, a system for limiting access to a deprecated method of a software implementation is disclosed. The system includes an access controller code and a call stack. The access controller code includes an access control policy configured to be used to determine an accessibility of a caller element to the deprecated method. The call stack defines at least the caller element and the deprecated method and is capable of being inspected to determine accessibility to the caller element.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1 is a block diagram of a computer system implementing the methods and systems of the present invention, in accordance with one embodiment of the present invention.

FIG. 3A-1 is a block diagram illustrating the implementation of methods and classes of the library of a reference implementation to form a call stack, in accordance with yet another embodiment of the present invention.

FIG. 3A-2 is a block diagram illustrating the implementation of methods and classes of the library of a reference implementation to form a full call stack, in accordance with yet another embodiment of the present invention.

FIG. 4A-1 is a block diagram depicting a call stack wherein a deprecated method is called by a <system method>, in accordance with still another embodiment of the present invention.

FIG. 4A-2 is a block diagram illustrating the calling of a deprecated method by a non-system (i.e., application) method, in accordance with yet another embodiment of the present invention.

FIG. 4A-3 is a block diagram illustrating the calling of a deprecated method by a system method, in accordance with still another embodiment of the present invention.

FIG. 4A-4 is a block diagram illustrating the calling of a deprecated method by a non-system method, in accordance with still another embodiment of the present invention.

DETAILED DESCRIPTION OF THE PREFERRED EMBODIMENTS

Figure 2:
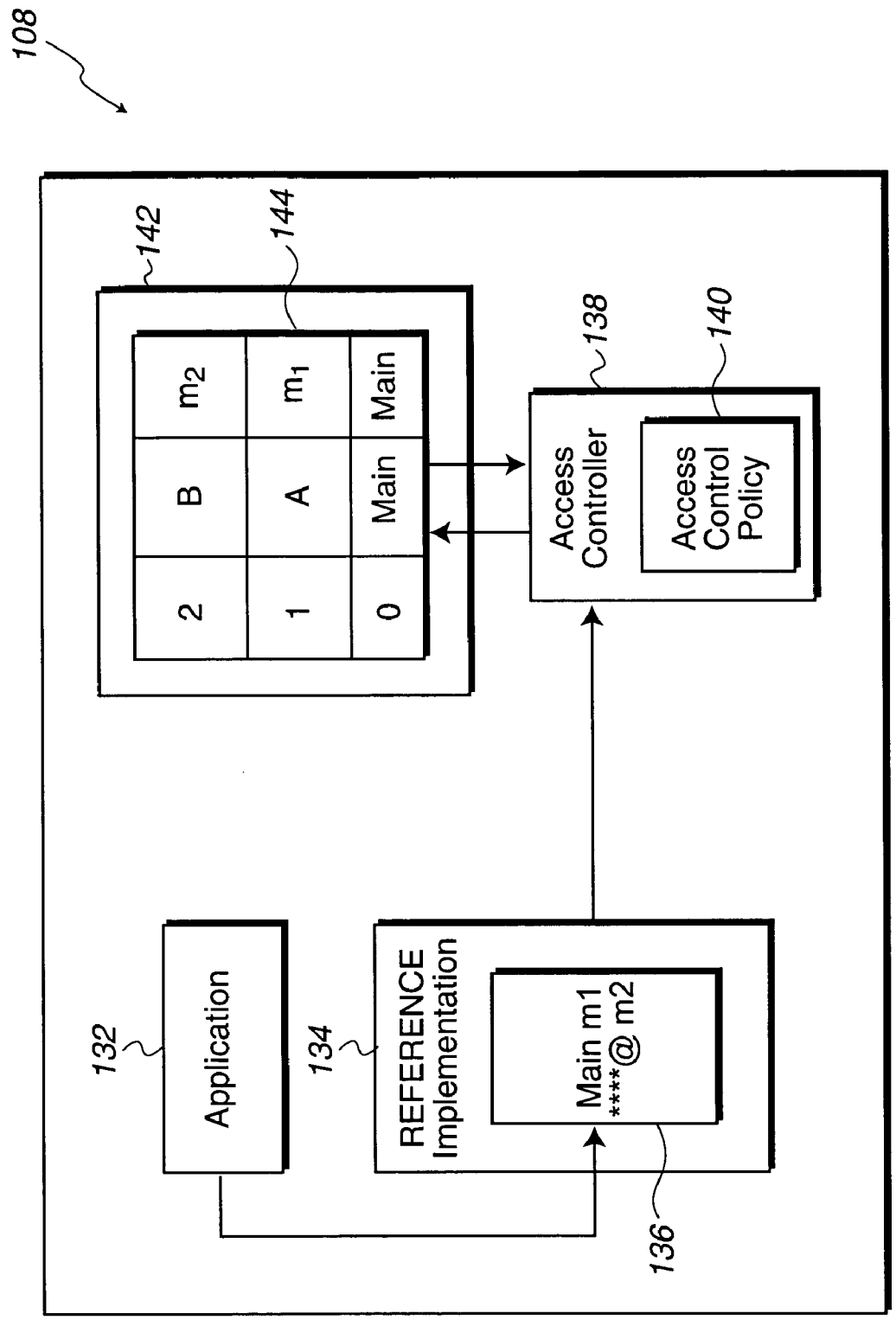
FIG. 2 is a block diagram illustrating the information and data stored in the main memory, in accordance with another embodiment of the present invention.

An invention for restricting use of deprecated elements or attributes in a computer software specification is disclosed.

In one embodiment, the present invention detects the existence of deprecated elements and attributes during run time. In one embodiment, the deprecated element is a class or the deprecated attribute is a method.

In one implementation, an access controller selects one of a plurality of pluggable access control policies to determine accessibility to the deprecated method. By way of example, upon detecting the existence of the deprecated method, a set of criteria of the selected access control policy is implemented to determine whether a caller element should be allowed access to the deprecated method. In one aspect, the caller element is allowed access to the deprecated method if the caller element is determined to be an internal caller or have a domain that is identical to the domain of the deprecated method (i.e., a system caller). However, access to the deprecated method is denied when the caller element is determined to be an external caller or have a domain that differs from the domain of the deprecated method (i.e., non-system caller).

In one exemplary embodiment, a call stack having a plurality of stack frames is built using the caller element, the intervening methods and classes, and the deprecated method is examined to locate the caller element. For instance, where the call stack includes reflection methods, almost all the stack frames associated with the reflection methods are by passed so as to locate the caller element. Then, a determination is made as to whether the caller element is a system method or an application method.

As one embodiment of the present invention implements the JAVA programming language, an overview of JAVA is provided below. In operation, a user of a typical JAVA based system interacts with an application layer of a system generally written by a third party developer. The application layer generally provides the user interface for the system. A JAVA module is used to process commands received by the application layer. A JAVA virtual machine is used as an interpreter to provide portability to JAVA applications. In general, developers design JAVA applications as hardware independent software modules, which are executed JAVA virtual machines. The JAVA virtual machine layer is developed to operate in conjunction with the native operating system of a particular hardware, which represents the physical hardware on which the system operates or runs. In this manner, JAVA applications can be ported from one hardware device to another without requiring updating of the application code.

Unlike most programming languages, in which a program is compiled into machine-dependent, executable program code, JAVA classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, JAVA is a programming language designed to generate applications that can run on all hardware platforms, small, medium and large, without modification. Developed by Sun, JAVA has been promoted and geared heavily for the Web, both for public Web sites and intranets. Generally, JAVA programs can be called from within HTML documents or launched standalone. When a JAVA program runs from a Web page, it is called a "JAVA applet," and when run on a Web server, the application is called a "servlet."

JAVA is an interpreted language. The source code of a JAVA program is compiled into an intermediate language called "byte code". The byte code is then converted (interpreted) into machine code at runtime. Upon finding a JAVA applet, the Web browser invokes a JAVA interpreter (JAVA Virtual Machine), which translates the byte code into machine code and runs it. Thus, JAVA programs are not dependent on any specific hardware and will run in any computer with the JAVA Virtual Machine software. On the server side, JAVA programs can also be compiled into machine language for faster performance. However a compiled JAVA program loses hardware independence as a result.

Figures 1, 3A:
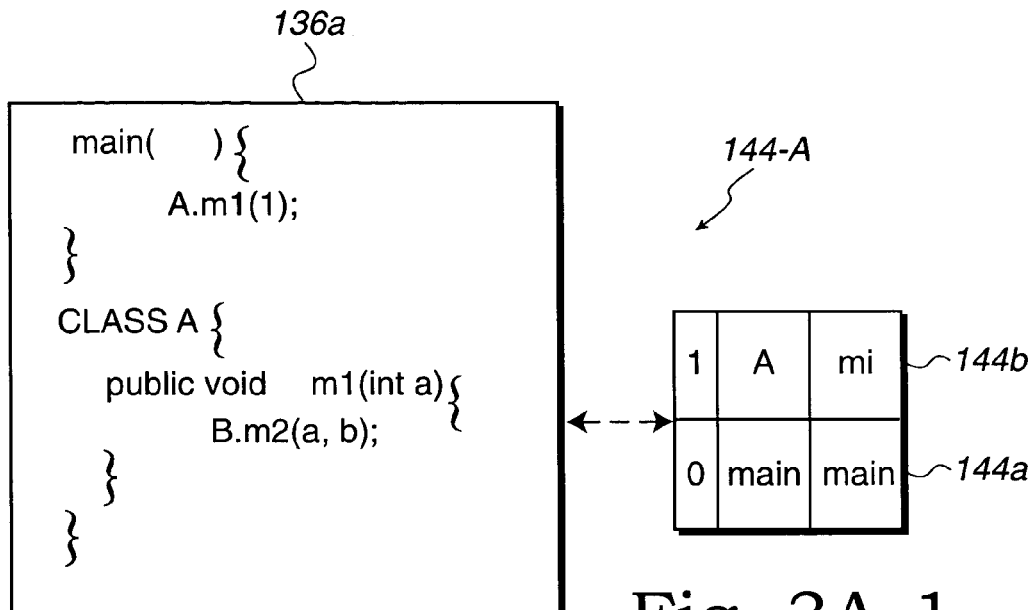

Keeping this brief introduction to JAVA in mind, reference is made to a block diagram 100 of FIG. 1 illustrating a computer system 102 implementing the methods and system of the present invention, in accordance with one embodiment of the present invention. The computer system 102 includes a storage device 104, a read only memory (ROM) 106, a random access memory (RAM) 108, a processor 114, and a communication interface 112, each of which is coupled to a communication bus 110. In one example, the RAM memory 108 is the main memory or any other dynamic storage device configured to store information and instructions to be executed by the processor 114. In a like manner, the ROM 106 can be any static storage device for storing the static information and instructions to be executed by the processor 114. The storage device 104 can be a magnetic disk or optical disk configured to be used for storing information and instructions.

The communication interface 112 is coupled to the communication bus 110 and is configured to provide a two-way data communication connection to a network link 130 that may be connected to a local network 124. For instance, in one embodiment, the communication interface 112 may be a modem configured to provide a data communication connection. In another embodiment, the communication interface 112 may be a local area network ("LAN") card configured to provide a data communication connection to a compatible LAN. In one instance, wireless links may also be implemented. By way of example, the communication interface 112 may be configured to send and receive electrical, electromagnetic or optical signals that carry digital data streams representing various types of information.

In one implementation, the network link 130 provides data communication through one or more networks to other data devices. For instance, the network link 130 may provide a connection through local network 124 to a host computer 122 or to a wide area network ("WAN") such as an Internet 126. The local network 124 and the Internet 126 both use electric, electromagnetic or optical signals that carry digital data streams. The signals through the various networks and the signals on network link 130 and through communication interface 112, which carry the digital data to and from computer system 100, are exemplary forms of carrier waves transporting the information.

In one example, the communication bus 110 and thus the computer system 102 are connected to a display 120, an input device 118, and a cursor control 116 via a connector bus 111. In one embodiment, the display 120 is a cathode ray tube (CRT), designed for displaying information to a computer user while the input device is a keyboard configured to communicate the information and commands to the processor 114. In one instance, the cursor control 116 is a type of user input device, such as mouse, and is configured to be used to communicate with the processor 114 for controlling cursor movement on the display.

FIG. 2 is a block diagram illustrating the information and data stored in the main memory (e.g., RAM memory) 108, in accordance with one embodiment of the present invention. In the embodiment of FIG. 2, the RAM Memory 108 stores a software application 132, a reference implementation 134, a JAVA virtual machine 142, and an access controller 138. In one example, the access controller 138, the application 132, and the reference implementation 134 are defined in the JAVA layer. In accordance to one embodiment, the reference implementation is a simulation of a real implementation and is distributed as JAVA source code.

As shown in the embodiment of FIG. 2, while the application 132 is running, the application 132 calls a deprecated method M2 defined in a library 136. After the method M2 is called by the application 132, the reference implementation 134 communicates with the access controller 138 so as to determine whether the application 132 is allowed access to the deprecated method M2. The access controller 138 then communicates with the JAVA virtual machine 142 requesting a call stack 144. In one example, the call stack 144 is a collection of stack frames with each stack frame having an index, a class, and a method. In one example, the JAVA virtual machine 142 is configured to load two categories of classes:

System classes: In one instance, the system classes are loaded using the—bootclasspath option (e.g., —classes.zip, etc.); and Application classes: In one example, the application classes are loaded using the—classpath option (e.g., —javatv.jar, etc.).

With a continued reference to FIG. 2, the call stack 144 is then retrieved by the access controller 138, which then selects the proper access control policy for determining the accessibility of the deprecated method M2 by the application 132. In one embodiment, the call stack defines the caller element (caller method), the domain of the caller element (e.g., system call or non-system call), and the deprecated method. The call stack can be inspected so as to determine whether the caller element can access the deprecated method.

An exemplary access control policy is shown below in Table 1.

TABLE 1

Exemplary Access Control Policy

```
void checkMethodAccess(VMStackFrame[ ] frames) {
    dmf_index = get the index of the deprecated method frame in the call stack ;
    if ( caller in frames[dmf_index+1]'s is not a system class )
        throw new NoSuchMethodError( );
    /* the caller is a system class, check for reflective invocation */
    if ( caller in frames[dmf_index+1]'s is Method.invoke( ) ||
            Constructor.newInstance( ) ||
            Class.newInstance0( )) {
        dmf_index = index of the frame that called the reflection code ;
        if ( caller in frames[dmf_index]'s is not a system class )
            throw new NoSuchMethodError( );
    }
    return normally ; /* access granted */
}
```

In one embodiment, two packages are configured to be added to the reference implementation 134:

Sun.misc.stack package:

In one instance, this package serves as a helper package to implement the access control policy. In one embodiment, the Sun.misc.stack package provides two classes:

VMStack: In one embodiment, the VMStack abstracts the call stack and has a native method which returns an array of VMStackFrame objects that represent the call stack; and VMSStackFrame: In one example, the VMStackFrame abstracts the stack frame.

By way of example, in accordance to one embodiment, the native method shown in Table 2 is defined in the VMStack and is used in the sun_misc_stack.c source. The method is linked to javai library and is implemented as a JNI method.

TABLE 2

Exemplary Native Method private native static VMStackFrame[ ] newStackFrames(byte, int,int);

In one instance, the sources shown in Table 3 are configured to be added.

TABLE 3

| Exemplary Added Sources |
| --- |
| share/java/lang/sun_misc_stack.c |

In one example, the package can be created by adding the sources shown in Table 4.

TABLE 4

| Exemplary Added Sources |
| --- |
| a.. share/sun/sun/misc/stack/VMStack.java |
| b.. share/sun/sun/misc/stack/VMStackFrame.java |

Sun.misc.deprecation package:

The Sun.misc.deprecation package defines an interface AccessPolicy, which provides a method shown in Table 5, configured to be used by any policy object.

TABLE 5

| Exemplary Access Control Method |
| --- |
| public void checkMethodAccess(VMStackFrame[ ] frames) ; |

In one instance, a default access control policy implementation DefaultAccessPolicy is included in the package. An AccessController class is configured to define a static method checkMethodAccess() designed to be called by the deprecated method code. In one embodiment, the AccessController.checkMethodAccess() does not perform any operation by default. In one instance, the JAVA property shown in Table 6 is configured to be set prior to invoking the present invention.

TABLE 6

| Exemplary JAVA Property to Be Set |
| --- |
| pjava -Dsun.misc.deprecation.access.policy=default some-class |

In one embodiment, the exemplary sources shown in Table 7 are configured to be added.

TABLE 7

| Exemplary Sources Added |
| --- |
| a.. share/sun/sun/misc/deprecation/AccessController.java |
| b.. share/sun/sun/misc/deprecation/AccessPolicy.java |

TABLE 8

Exemplary Code to Use sun.misc.deprecation Package

```
public class DeprecatedClass {
    /**
     * @deprecated this class is deprecated
     */
    public DeprecatedClass( ) {
        AccessController.checkMethodAccess( ) ;
        ...
        ...
    }
}
public class DeprecatedMethod {
    /**
     * @deprecated this method is deprecated
     */
    public void deprecatedMethod( ) ;
        AccessController.checkMethodAccess( ) ;
        ...
        ...
    }
```

In one embodiment, a software application of the present invention is called Tarsier. Table 9 shows an Exemplary JAVA code implemented in Tarsier.

TABLE 9

Exemplary JAVA-based Tarsier Code

```
/*
 * @(#)AccessController.java
 *
package sun.misc.deprecation ;
import java.lang.reflect.Method ;
import java.lang.reflect.Constructor ;
import java.lang.reflect.Member ;
import sun.misc.stack.VMStack ;
import sun.misc.stack.VMStackFrame ;
/**
 * <code>AccessController</code> encapsulates methods to check if the
 * caller has access to the deprecated methods and classes. In one example, this
defines static method and cannot be used to instantiate an object. This
 * contains a <code>AccessPolicy</code> implementation, which gets
 * delegated when access checks are made.
 * <p>
 * The default behavior of<code>AccessController</code>check methods is
 * nothing. The behavior can be changed to perform access checking by
 * setting the system property
 * <b>sun.misc.deprecation.access.policy</b>to either a fully qualified
 * class name that implements <code>sun.misc.deprecation.AccessPolicy</code>
 * interface or the keyword <b>default</b> or <b>defaultDebug</b>.
```

TABLE 9-continued

Exemplary JAVA-based Tarsier Code

```
* Setting it to <b>default</b>will create a default access policy
* implementation and <b>defaultDebug</b> will create a debug version of the
* default access policy implementation.
*
public final class AccessController {
    static AccessPolicy accessPolicy = null ;
        /* create a AccessPolicy implementation depending on the property */
        static {
            Class policy_class = null ;
            String policy = null ;
            policy = System.getProperty("sun.misc.deprecation.access.policy") ;
            if ( policy !=null ) {
                if ( policy.equals("default"))
                    policy_class = DefaultAccessPolicy.class ;
                else
                if ( policy.equals("defaultDebug") )
                    policy_class = DebugDefaultAccessPolicy.class ;
                else {
                    /* it should be a class that implements AccessPolicy */
                    try {
                        policy_class = Class.forName(policy) ;
                    }
                    catch ( Exception ex ) {
                        System.err.println(AccessController.class+ ":"+ policy+
                        " is not a valid policy class, using default policy<"+
                            ex+">");
                    }
                }
            }
        /* create the policy object */
        if ( policy_class != null) {
            try {
                accessPolicy = (AccessPolicy)policy_class.newInstance( );
            }
            catch ( Exception ex ) {
                System.err.println(AccessController.class+":"+
                            "cannot instantiate instance of"+
                            policy_class+"<"+ex+">") ;
            }
        }
    }
    /**
    * Checks if the caller's caller has access to the deprecated method.
    * The caller of this method is assumed to be deprecated, since
    * there is no API to verify that attribute. It is the responsibility
    * of the caller to make sure that this method is invoked by
    * deprecated methods
    *
    * @throws java.security.AccessControlException if access is not allowed
    *                else returns silently
    */
    public static void checkMethodAccess( ) {
        /* This is how the stack would look like, when we make the call to
        * get the stack frames. We are interested only in 4 frames starting
        * from index 3 (the deprecated method)
        * [0] sun.misc.stack.VMStack.newStackFrames( )
        * [1] sun.misc.stack.VMStack.getStackFrames( )
        * [2] sun.misc.deprecation.AccessController.checkMethodAccess( )
        * [3] << deprecated method >>
        * [4] << reflection method 1 >>
        * [5] << reflection method 2 (Class.newInstance( ))>>
        * [6] << system method or non-system method >>
        * [7] ...
        * [8] ...
        */
        if ( accessPolicy != null ) {
            accessPolicy.checkMethodAccess(VMStack.getStackFrames(3,4)) ;
        }
    }
}
/**
* <code>DefaultAccessPolicy</code> allows deprecated method access
* for system classes, other classes are not allowed access. The
* algorithm used by the check method is as follows
* <pre>
*       if ( frames[caller_index]'s method is not a system class )
*           throw new NoSuchMethodError( );
```

TABLE 9-continued

Exemplary JAVA-based Tarsier Code

```
*           if ( frames[caller_index+1]'s method is Method.invoke( ) ||
*                               Constructor.newInstance( ) ||
*                               Class.newInstance( ) ) {
*               caller_index = index of the frame that called the reflection code ;
*               if ( frames[caller_index]'s method is not a system class )
*                   throw new NoSuchMethodError( ) ;
*           }
*       return normally
* </pre>
* The procedure to check for a system class is
* <pre>
* (VMStackFrame.getCaller( ).getDeclaringClass( ).getProtectionDomain( ).
*               getCodeSource( ) == null)
* </pre>
*/
class DefaultAccessPolicy implements AccessPolicy {
    public void checkMethodAccess(VMStackErame[ ] f) {
        int caller_index = 1 ; /* this points to the caller of the
                                * deprecated method */
        Member caller = f[caller_index].getCaller( ) ;
        Class cclass = caller.getDeclaringClass( ) ; /* caller's class */
        String cmethod = caller.getName( );   /* caller's method */
        /*
         * System classes's code source is "null", where as non-system
         * classes's code source is "non-null, so we check the code source
         * of the caller who invoked the deprecated method to decide if
         * we need allow access or not.
         */
        if ( cclass.getProtectionDomain( ).getCodeSource( ) != null) {
            throw new NoSuchMethodError(f[0].getCaller( )+" is deprecated");
        }
        /*
         * The caller is a system class, so we check if it is part of the
         * reflection system. If it is then we bump the "caller_index" to point
         * to the caller of the reflective method.
         */
        if ((cclass ==Method.class && cmethod.equals("invoke")) ||
            (cclass == Constructor.class && cmethod.equals("newInstance")) )
            caller_index += 1; /* skip the reflection frame */
        else
        if ((cclass == Class.class && cmethod.equals("newInstance0")))
            caller_index +=2 ; /* skip reflection frame +
                                * java.lang.Class.newInstance frame */
        else
            return ; /* non-reflective system class, access granted */
        /*
         * Check if the caller of the reflection methods is a system class or
         * a non-system class.
         */
        caller = f[caller_index].getCaller( )
        cclass = caller.getDeclaringClass( );
        if ( cclass.getProtectionDomainO.getCodeSource( ) != null ) {
            throw new NoSuchMethodError(f[0].getCaller( )+" is deprecated")
        }
    }
}
/**
 * Debug version of the default access policy object
 */
class DebugDefaultAccessPolicy extends DefaultAccessPolicy {
    public void checkMethodAccess(VMStackFrame[ ] f) {
        Member caller       = null ;
        String caller_type  = null ;
        for (int i = 0 ; i < f.length ; i++ ) {
            caller = f[i].getCaller( );
            if ( caller.getDeclaringClass( ).getProtectionDomain( ).
                    getCodeSource( ) != null )
                caller_type = " ";
            else
                caller_type = "*";
            System.out.println("["+i+"] "+caller_type+caller) ;
        }
        super.checkMethodAccess(f);
    }
}
/*
* @(#)AccessPolicy.java
```

TABLE 9-continued

Exemplary JAVA-based Tarsier Code

```
package sun.misc.deprecation;
import sun.misc.stack.VMStackFrame ;
/**
 * <code>AccessPolicy</code>specifies the interface that should be
 * implemented by any policy object. A default implementation of
 * <code>AccessPolicy</code> is provided by <code>DefaultAccessPolicy</code>,
 * which is package private.
 *
public interface AccessPolicy {
    /**
     * Checks if the caller have access to the deprecated method
     *
     * @param frames stack frames. The first frame will be that of the
     *    the deprecated method. There can be no more than 4 frames at
     *    the maximum.
     *
     * @throws java.security.AccessControlException if the caller does not
     *       have access to the deprecated method.
     */
    public void checkMethodAccess(VMStackFrame[ ] frames)
}
/*
 * @(#)AccessPolicy.java
 *
package sun.misc.deprecation;
import sun.misc.stack.VMStackFrame ;
/**
 * <code>AccessPolicy</code> specifies the interface that should be
 * implemented by any policy object. A default implementation of
 * <code>AccessPolicy</code> is provided by <code>DefaultAccessPolicy</code>,
 * which is package private.
 */
public interface AccessPolicy {
    /**
     * Checks if the caller have access to the deprecated method
     *
     * @param frames stack frames. The first frame will be that of the
     *    the deprecated method. There can be no more than 4 frames at
     *    the maximum.
     *
     * @throws java.security.AccessControlException if the caller does not
     *    have access to the deprecated method.
     */
    public void checkMethodAccess(VMStackFrame[ ] frames);
}
/*
 * @(#)VMStackFrame.java
 *
 */
package sun.misc.stack;
import java.lang.reflect.Member;
/**
 * <code>VMStackFrame</code>encapsulates a stack frame within
 * a call stack.
 *
 */
public final class VMStackFrame {
    Member caller ;
    /**
     * Only the native code can create an instance of
     * <code>VMStackFrame</code>
     */
    private VMStackFrame( ) { }
    /**
     * Get the caller associated with the stack frame
     *
     * @return <code>java.lang.reflect.Member</code>
     */
    public Member getCaller( ) {
        return caller ;
    }
}
```

Implementing the methods and classes of the library 136 of the reference implementation 134 to build the call stack 144 for the caller element can further be understood with respect to the embodiments in FIGS. 3A-1 through 3A-2, in accordance with one embodiment of the present invention. In the embodiment of FIG. 3A-1, a call stack 144-A includes a stack frame 144b revealing the calling of the M1 method in a class A by a stack frame 144a showing the called method main in a class Main. As shown, a library 136a includes the source code wherein a method M1 is called by the class A. Simply stated, the call stack 144-A is built for the caller element.

Continuing to FIG. 3A-2, a call stack 144-B formed in response to a source in the library 136b can further be understood. As shown, the library 136b includes the calling of the method M1 of class A, and the calling of the deprecated method M2 of class B. For ease of reference, the description of the deprecated method M2 has been flagged using the term "deprecated." As further shown, a first line of the deprecated method M2 is a call to "checkMethodAccess" method. In one instance, the "checkMethodAccess" method is included as a first line of each of the deprecated methods. In this manner, prior to running the deprecated method, a determination is made as to whether the caller of Method M2 should be allowed access to the deprecated method. As shown, a corresponding call stack 144-B includes three stack frames 144a through 144c, each respectively corresponding to the main method of the main class calling the method M1 of the class A in turn calling the deprecated method M2 of class B, respectively.

Figures 1, 4A:
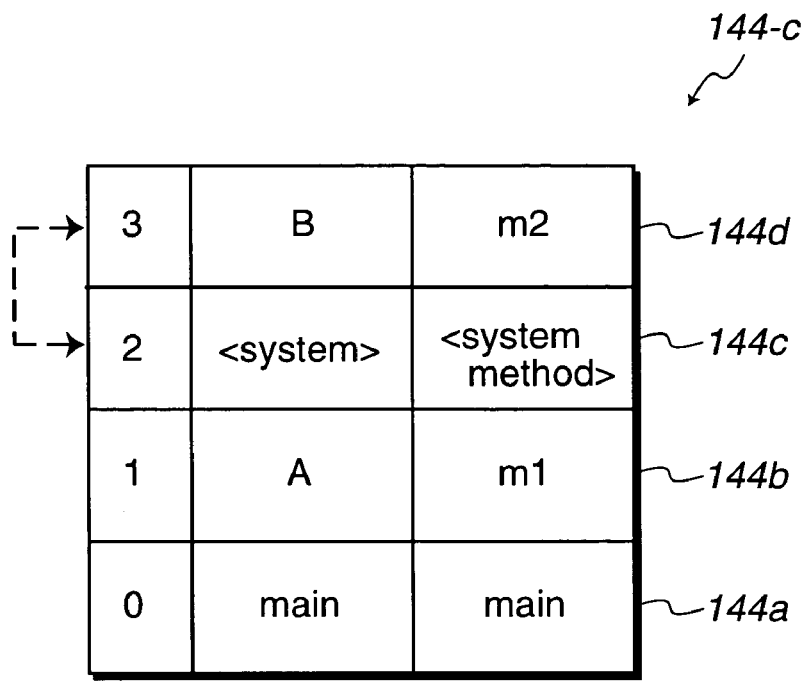
Figures 2, 4A:
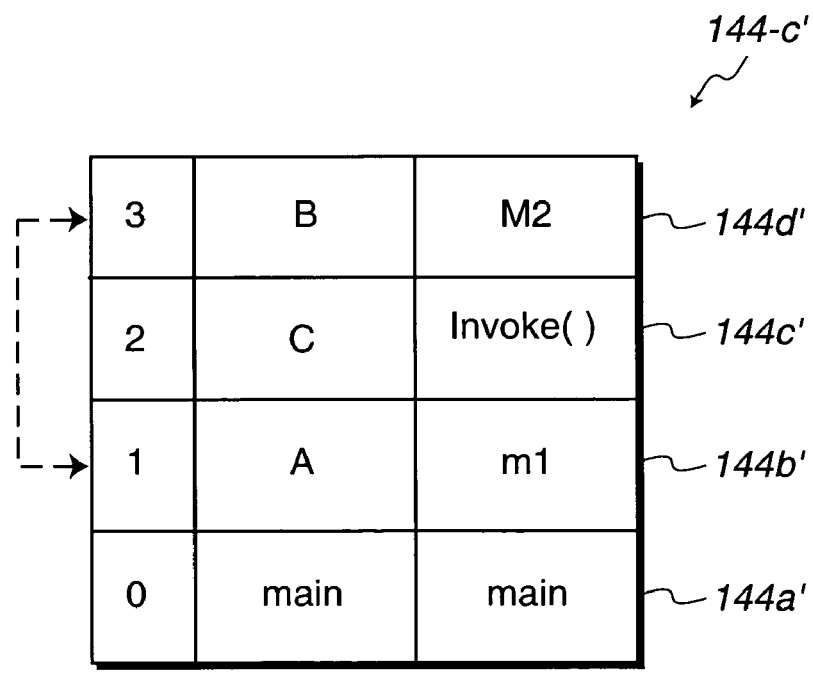

Reference is made to FIG. 4A-1 illustrating a call stack 144-C showing the calling of a deprecated method M2 by a <system method>, in accordance with one embodiment of the present invention. As shown, the stack frames 144a-144d of the call stack 144-C illustrate an exemplary succession of the caller classes and caller methods. The plurality of depicted stack frames 144a-144d have been indexed with the bottom most stack frame 144a having the index "0" and the top most stack frame 144d having the index "3." The stack frame 144a shows the calling of the main method of the main class followed by the calling of the method M1 of class A, as illustrated in stack frame 144b. The stack frame 144c shows the calling of a <system method> of the <system> class followed by the calling of the deprecated method M2 in the stack frame 144d. In one embodiment, the access controller 138 grants access to the deprecated method M2, as the caller method defined in the stack frame 144c below the stack frame 144d of the deprecated method M2 contains a system method.

Referring to FIG. 4A-2, calling of a deprecated method M2 by a reflection method "invoke()" which in turn is called by a non-system (i.e., application) method can further be understood, in accordance with one embodiment of the present invention. A call stack 144-C' includes a plurality of stack frames 144a'- 144-d', indexed as "0" to "3," respectively. As shown, the application method M1 calls the reflection method "invoke()" of a class "C." As illustrated, the reflection method "invoke()" itself calls the deprecated method M2. In one embodiment, the access controller is configured to implement the proper access control policy to determine whether the deprecated method M2 can be accessed. In doing so, the access controller determines that the method M1, the method calling the reflection method "invoke(), " is a non-system method. Upon making such determination, access is denied to the deprecated method M2 and a noSuchMethodError is dispatched to the user.

Figures 2, 3A:
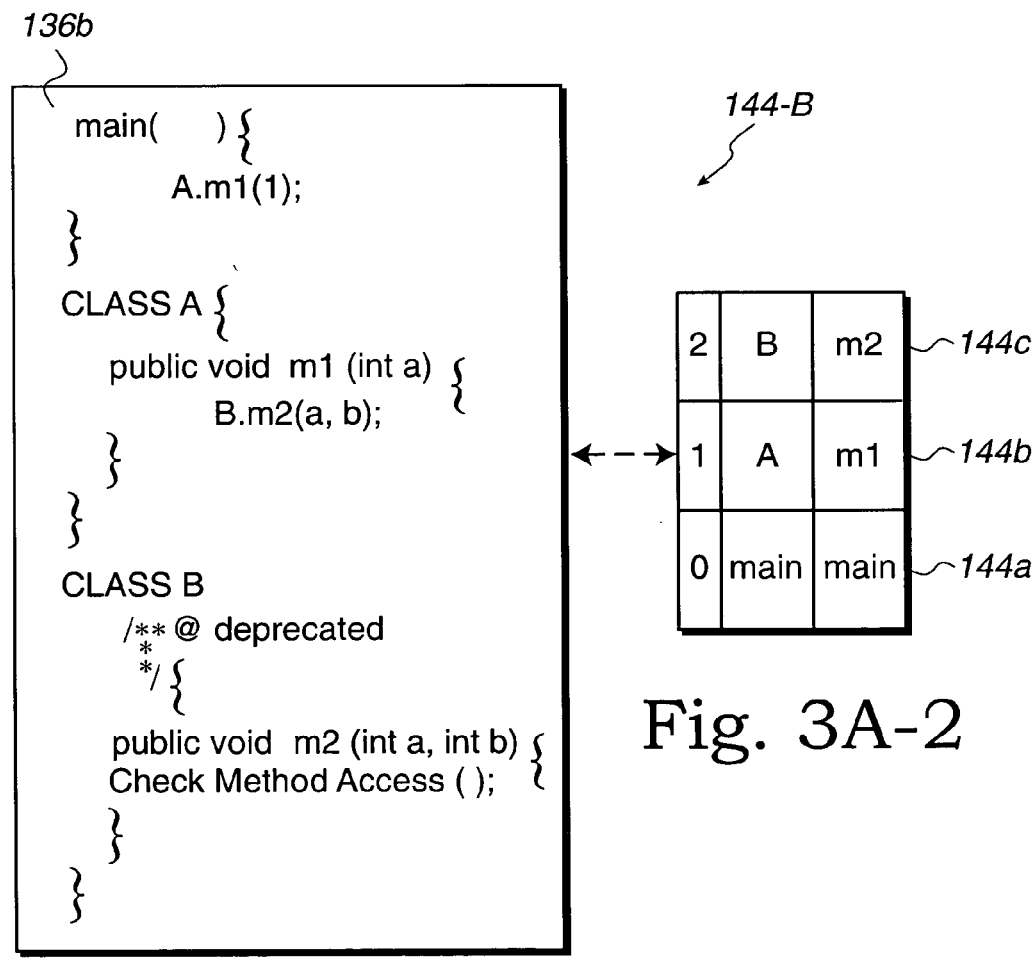

In contrast, the deprecated method M2 of stack frame 144d " of FIG. 4A-3 can be accessed by the <system method> of a stack frame 144b", in accordance with one embodiment of the present invention. That is, in the embodiment of FIG. 4A-3, the access controller grants access to the deprecated method M2 upon determining that the method calling the reflection method "invoke()," which in turn calls the deprecated method M2, is a <system method>.

Similarly, in the embodiment of FIG. 4A-4, a stack call 144-C''' includes a plurality of stack frames 144a'''-144e''', which have been indexed with the bottom most stack frame 144a''' having the index "0" and the top most stack frame 144e''' having the index "4. " As shown, the stack frames 144c''' and 144d''' respectively include a <reflection method 1> and a <reflection method 2>. In one example, the <reflection method 1>is the method "newInstance0()" which in turn calls the <reflection method 2>"newInstance(). " By way of example, access to the deprecated method M2 is denied since the method M1 (i.e., the caller method below the reflection methods) is an application method. In a different embodiment, access to the deprecated method would have been granted had the caller method (i.e., the method calling the first reflection method) was a system method.

Figure 4B:
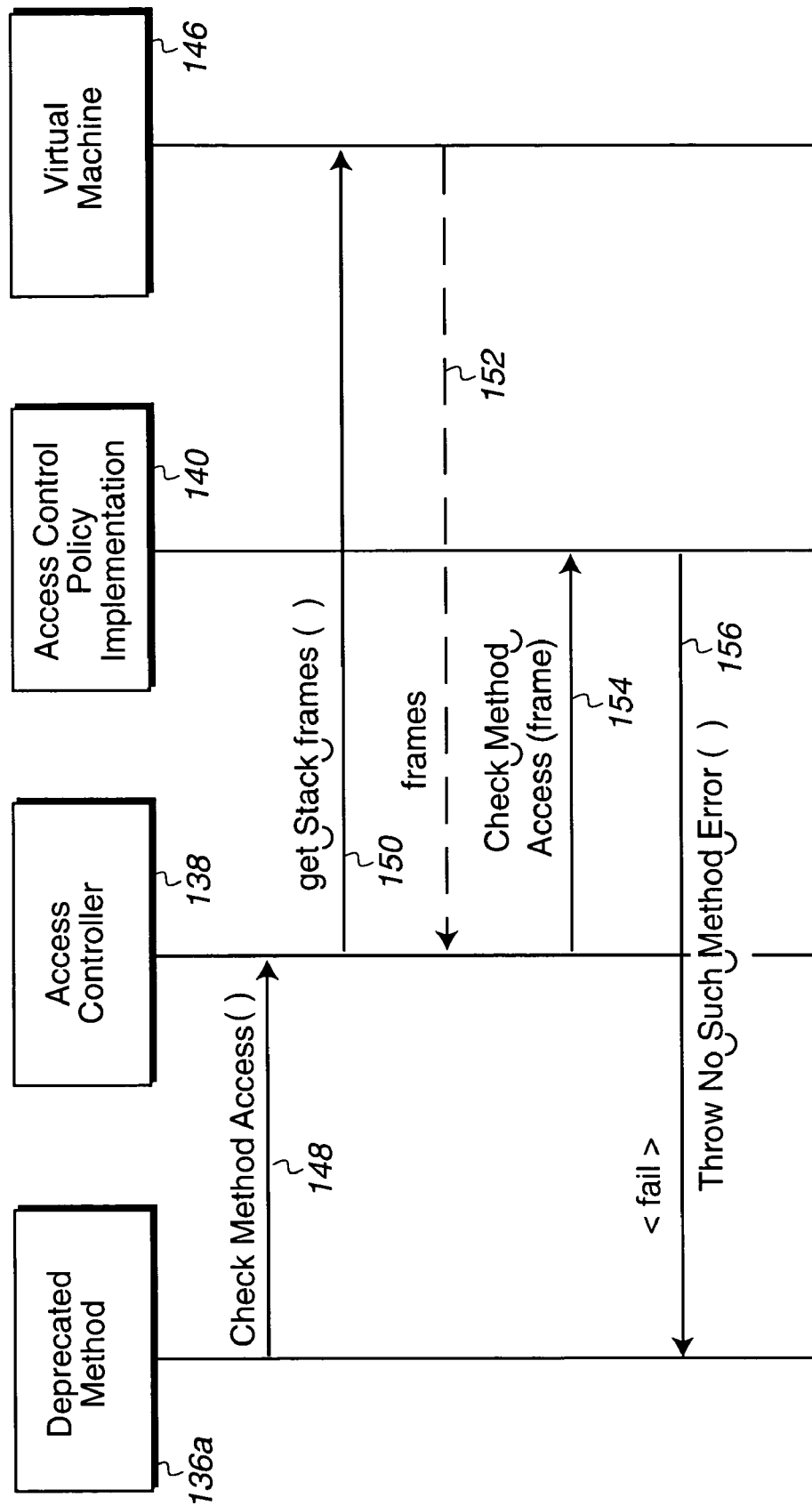
FIG. 4B is a sequence diagram showing the communication sequence in determining accessibility to a deprecated method, in accordance with still another embodiment of the present invention.
Figure 4C:
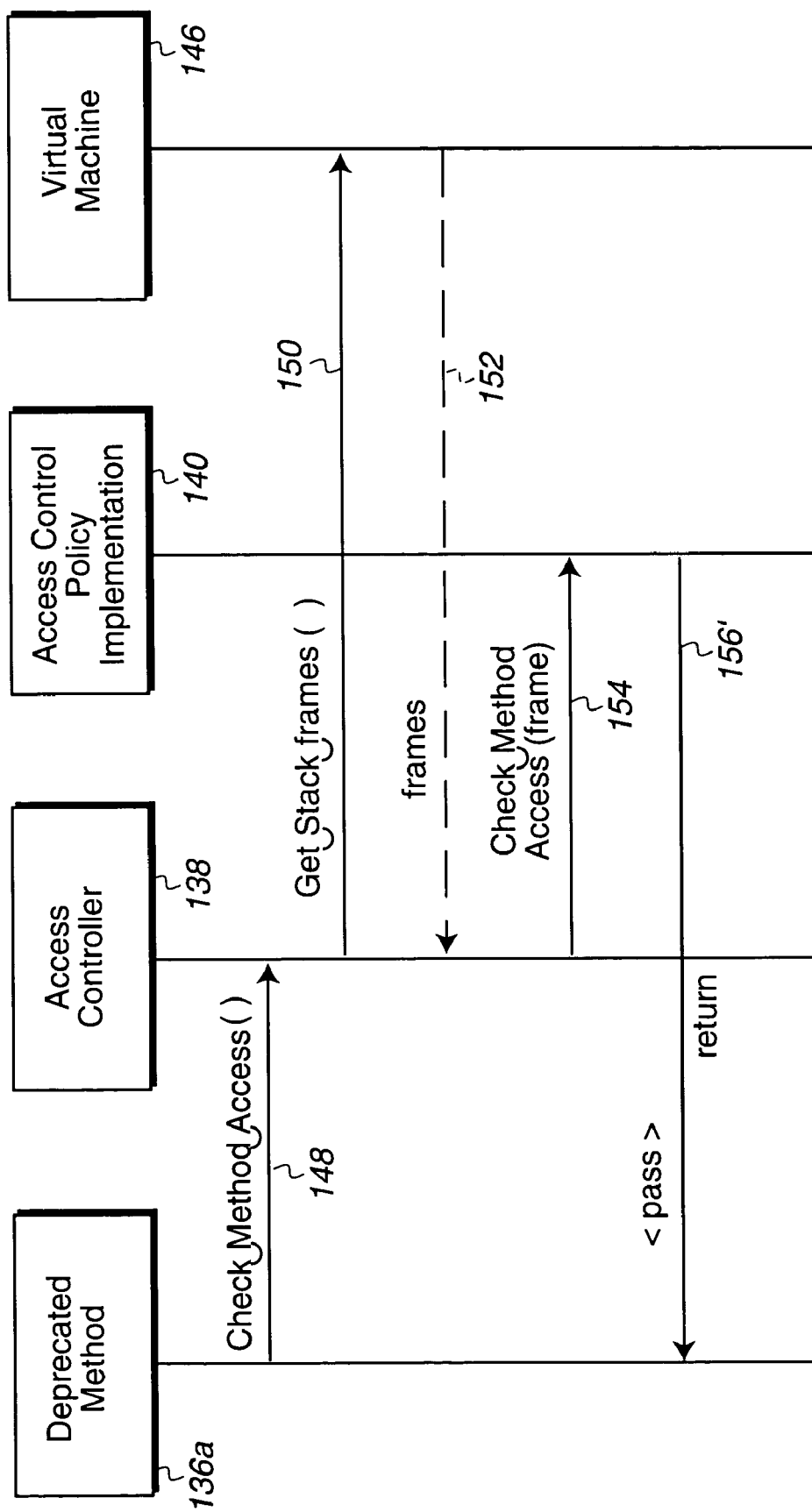
FIG. 4C is a sequence diagram showing the communication sequence in determining accessibility to a deprecated method, in accordance with yet another embodiment of the present invention.

The communication sequence in determining accessibility to a deprecated method can further be understood with respect to the sequence diagrams of FIGS. 4B and 4C, in accordance with one embodiment of the present invention. As illustrated in the embodiment of FIG. 4B, upon being called, a deprecated method 136a communicates a checkMethodAccess() method 148 to the access controller 138. Then, the access controller 138 communicates a getStackframes() method 150 to the virtual machine 146, which in turn communicates the stack frames 152 to the access controller. After receiving the stack frames 152, the access controller 138 communicates a checkMethodAccess(frame) 154 with an access control policy implementation 140. At this point, a determination is made as to whether the caller method is a system method or a non-system (i.e., application method). As illustrated in FIG. 4B, when it is determined that the caller method is an application method, the access control policy implementation 140 communicates a <fail> with the deprecated method, throwing a NoSuchMethodError() 156 error. On the contrary, as shown in the embodiment of FIG. 4C, if it is determined that the caller method is a system method, the access control policy implementation 140 communicates a <pass> with the deprecated method 136a, allowing the caller method access to the deprecated method.

Figure 5:
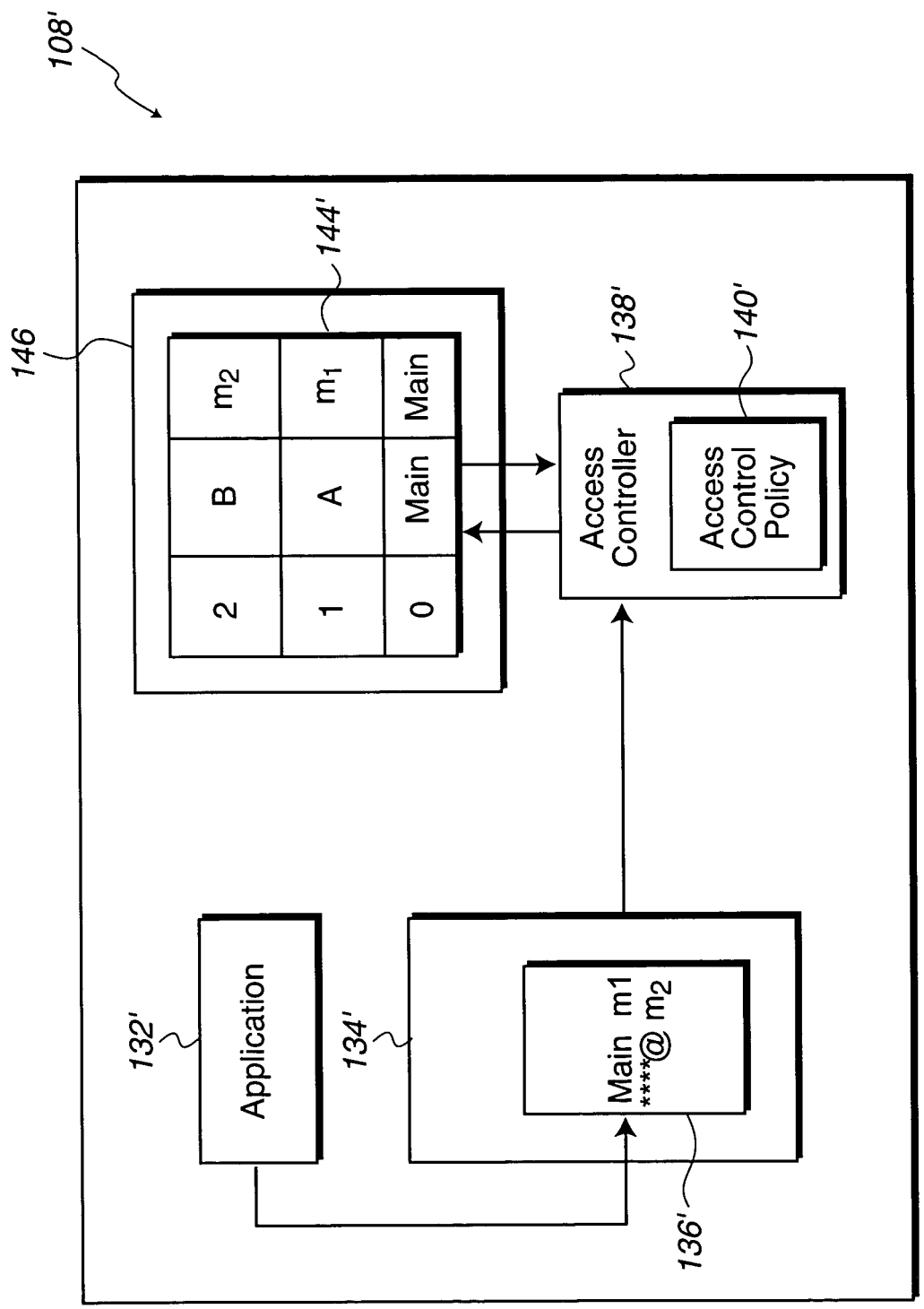
FIG. 5 is a block diagram of a computer system implementing the methods and systems of the present invention, in accordance with yet another embodiment of the present invention.

In accordance with another embodiment of the present invention, allowing access to a deprecated method can further be understood with respect to the block diagram shown in FIG. 5. By way of the illustrated example, a software application 132', a reference implementation 134', a JAVA virtual machine 146 are stored in a RAM Memory 108'. As illustrated, in one example, the JAVA virtual machine 146 can be configured to include an access controller 138', which in turn includes an access control policy 140'. In one implementation, the application 132' calls the deprecated method M2 in the library 136' during run time. Once the deprecated method has been called by the application 132', the reference implementation 134' communicates with the access controller 138' so as to determine whether the deprecated method M2 can be accessed by the application 132'. The access controller 138' then is configured to retrieve a call stack 144'. The access controller 138' then selects the proper access control policy 140' to be implemented in determining the accessibility of the deprecated method M2 by the application 132'. Thus, in accordance with a different embodiment of the present invention, the access controller and access control policy of the present invention may be implemented in the JAVA virtual machine rather than the JAVA layer component.

Figure 6A:
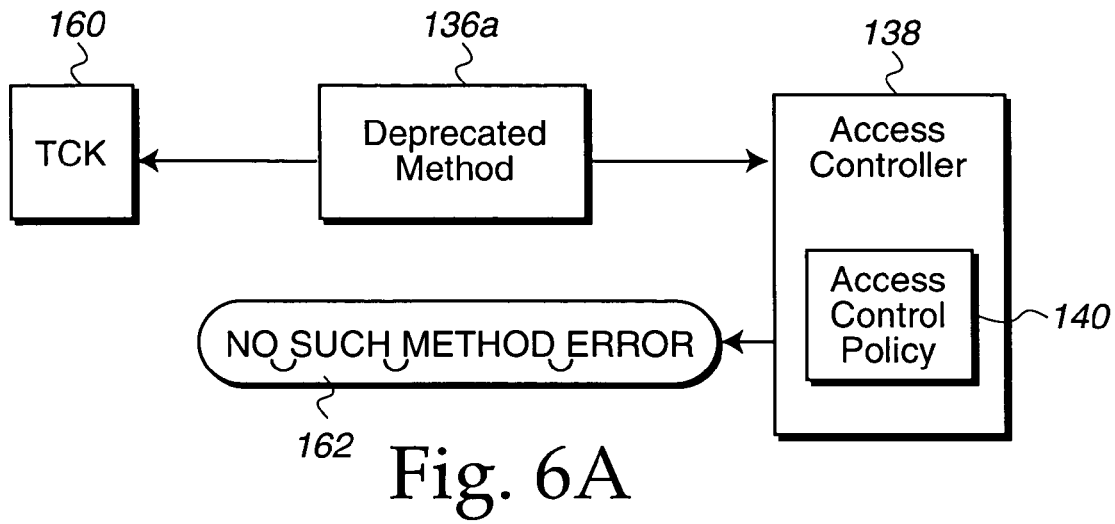
FIG. 6A is a block diagram illustrating the accessibility of a Test and Compatibility Kit ("TCK") to a deprecated method in a Multimedia Home Platform ("MHP"), in accordance with yet another embodiment of the present invention.

Referring to FIG. 6A, the accessibility of a Test and Compatibility Kit ("TCK") 160 to a deprecated method 136a in a Multimedia Home Platform ("MHP") implementation can further be understood, in accordance with one embodiment of the present invention. In one instance, the TCK can be implemented to determine if the implementation of a particular JAVA technology is compliant with the specification for the particular JAVA technology. In one aspect, the TCK is a suite of tests, tools, and documentation that allows an implementer of a JAVA technology specification to determine if the implementation is compliant with the specification.

The TCK typically includes a Test Harness, defined as the applications and tools that are used for test execution and test suite management, and a TCK Test Suite, which is the composite of the actual test cases in the TCK that are executed to test an implementation. The TCK can also include documentation that includes the specific TCK usage procedures, and the compatibility testing requirements that apply to the related technology release (usually in the form of a TCK user's guide). Also, a description of the TCK appeals process can be included, as well as an audit process, which is used to better ensure the integrity of a consistent self-testing compatibility program.

By way of example, the MHP is a specification configured to implement a Digital Settop boxes. The MHP includes JAVA technology as the application platform for developing applications for the settop box. The JAVA technology specified by MHP is a subset of a Personal JAVA Specification.

As shown in FIG. 6A, upon being called by the TCK 160, the deprecated method 136a communicates to the access controller 138 questioning whether the TCK 160 is allowed access to the deprecated method. In one example, this is achieved by including a checkMethodAccess() in the first line of the source code for the deprecated method 136a. The access controller 138 then uses a proper access control policy 140 to determine whether the TCK 160 should be allowed access to the deprecated method 136a. In one example, the access control policy 140 is configured to be a black and white access control policy in which access to the deprecated method 136a is denied since the calling method is not a system method (i.e., the calling method is a TCK method (a non-system call) and does not originate in MHP (a system call)).

Figure 6B:
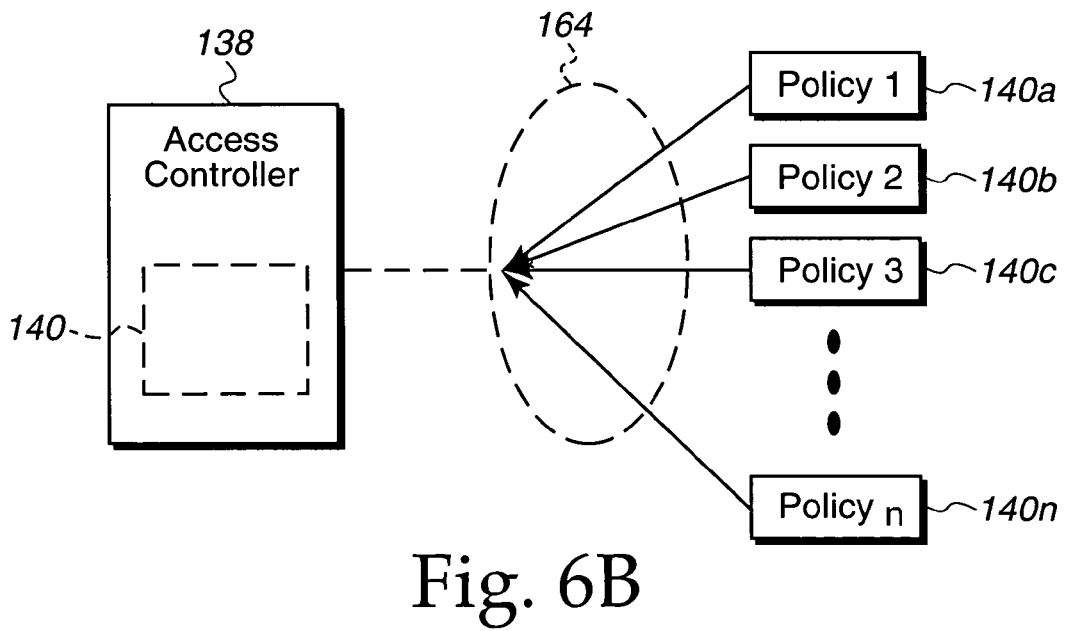
FIG. 6B is a block diagram showing the pluggability of the access control policy of the embodiments of the present invention, in accordance with still another embodiment of the present invention.

The pluggability of the access control policy of the embodiments of the present invention can further be understood with respect to the block diagram shown in FIG. 6B, in accordance with one embodiment of the present invention. As shown, a plurality of access control policy 1 through access control policy$_n$ 140a-140$_n$ can be plugged into the access controller 138 using a selectable policy 164. Thus, the pluggability of the access control policy enables the present invention to implement a diversity of access control policies.

Figure 7:
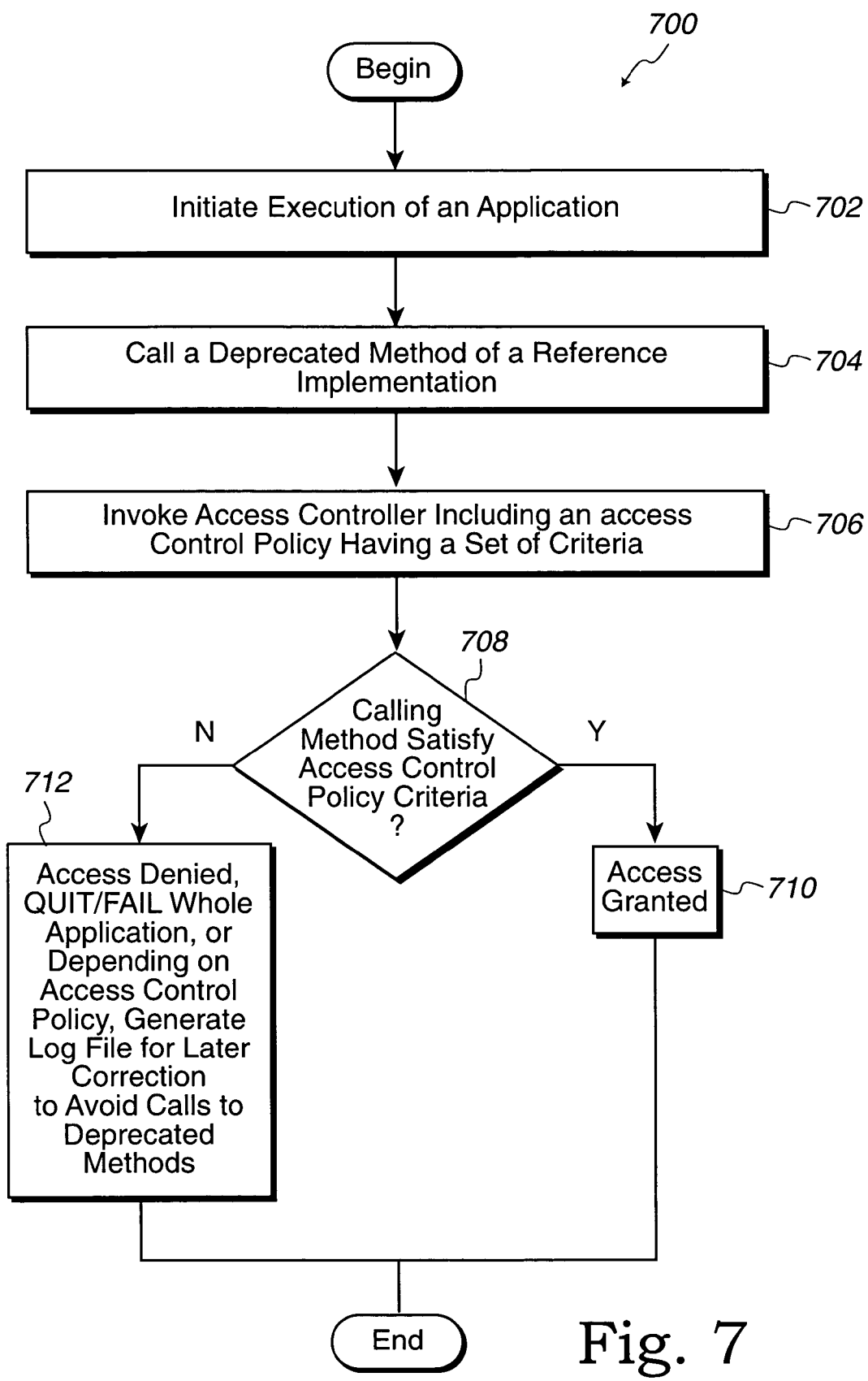
FIG. 7 is a flow chart diagram illustrating the method operations performed in determining the accessibility of a calling method to a deprecated method, according to still another embodiment of the present invention.

FIG. 7 depicts a flow chart 700 illustrating the method operations performed in determining the accessibility of a calling method to a deprecated method, in accordance to one embodiment of the present invention. The method begins in operation 702 in which the execution of an application is initiated. In one example, the application is a JAVA-based application. Next, in operation 704, the deprecated method of a reference implementation is called by the application.

Thereafter, in operation 706, an access controller including an access control policy is invoked. In one example, the access control policy is a pluggable policy and is configured to include a set of criteria utilized to decide whether the calling method should be allowed access to the deprecated method.

Continuing to operation 708, a determination is made as to whether the calling method of the application satisfies the access control policy criteria. In one example, the access control policy criteria may be that system methods can access deprecated methods whereas access should be denied to non-system methods. If in operation 708 a determination is made that the calling method satisfies the access control policy criteria, in operation 710, the calling application is granted access to the deprecated method. In the alternative, in operation 712, the calling application is denied access. The whole application is failed, or depending on the access control policy, a log file may be generated for future correction so as to avoid calling of the deprecated method by the calling application. In one embodiment, accessing exemplary classes, Class.forName(), Class.newInstance(), and Constructor.newInstance() and exemplary method, Method.invoke(), can be detected during run time.

Figure 8:
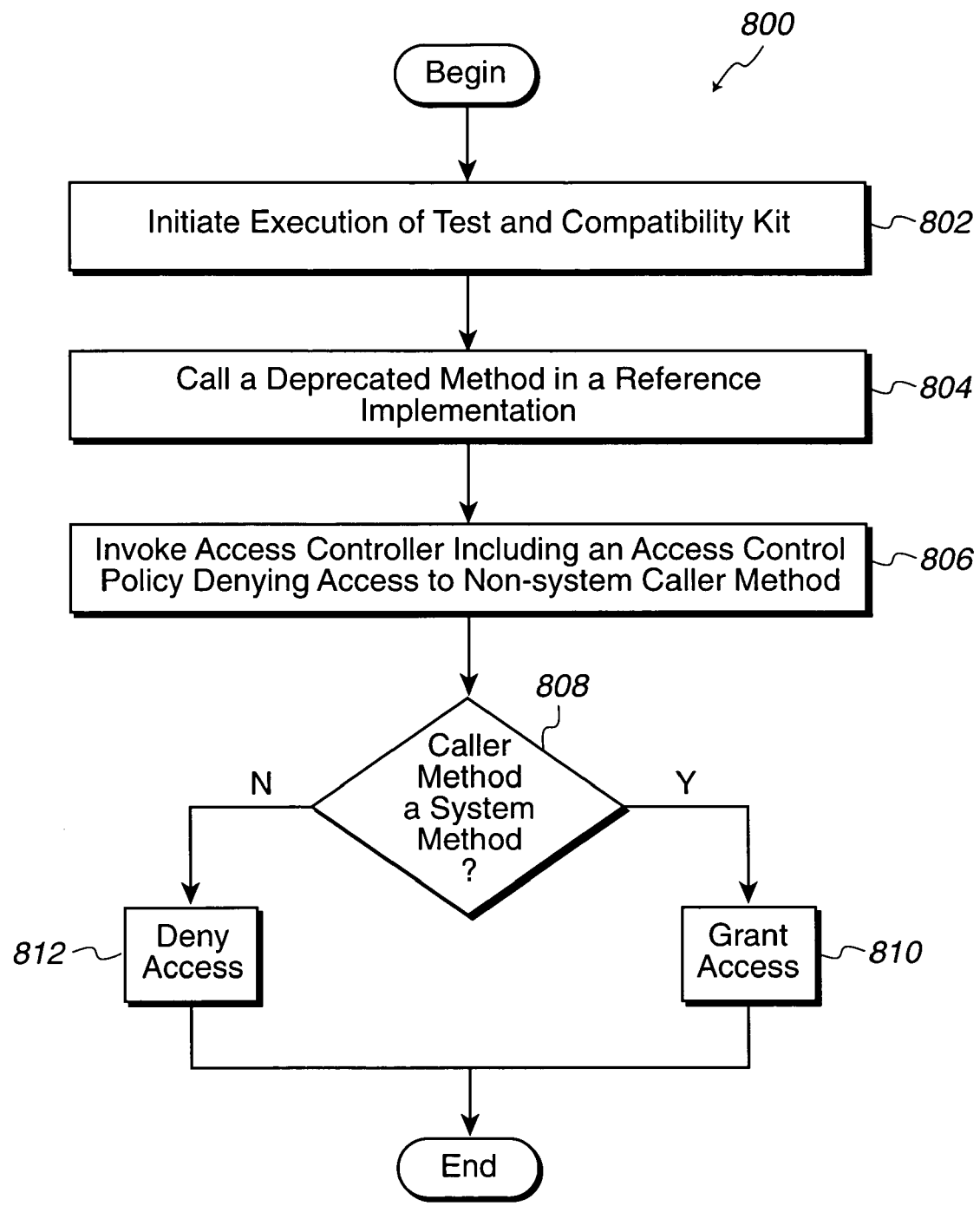
FIG. 8 is a flow chart diagram of the method operations performed in denying a Test and Compatibility Kit (TCK) accessibility to a deprecated method, according to still another embodiment of the present invention.

Referring to a flow chart 800 depicted in FIG. 8, the method operations performed in denying a Test and Compatibility Kit (TCK) accessibility to a deprecated method can further be understood, in accordance to one embodiment of the present invention. The method begins in operation 802 in which the execution of TCK is initiated. Next, in operation 804, a deprecated method in a reference implementation is called. In one embodiment, the reference implementation is JAVA-based. Proceeding to operation 806, an access controller including an access control policy is invoked. The access control policy denies non-system caller methods access to the deprecated method.

Continuing to operation 808, a determination is made as to whether the caller method of the TCK is a system method. If it is determined that the caller method is a system method, access is granted to the deprecated method in operation 810. However, since the TCK is an application (i.e., non-system), access to the deprecated method in the reference implementation is denied in operation 812. In one example, the execution of TCK is halted when a deprecated method is called.

Figure 9:
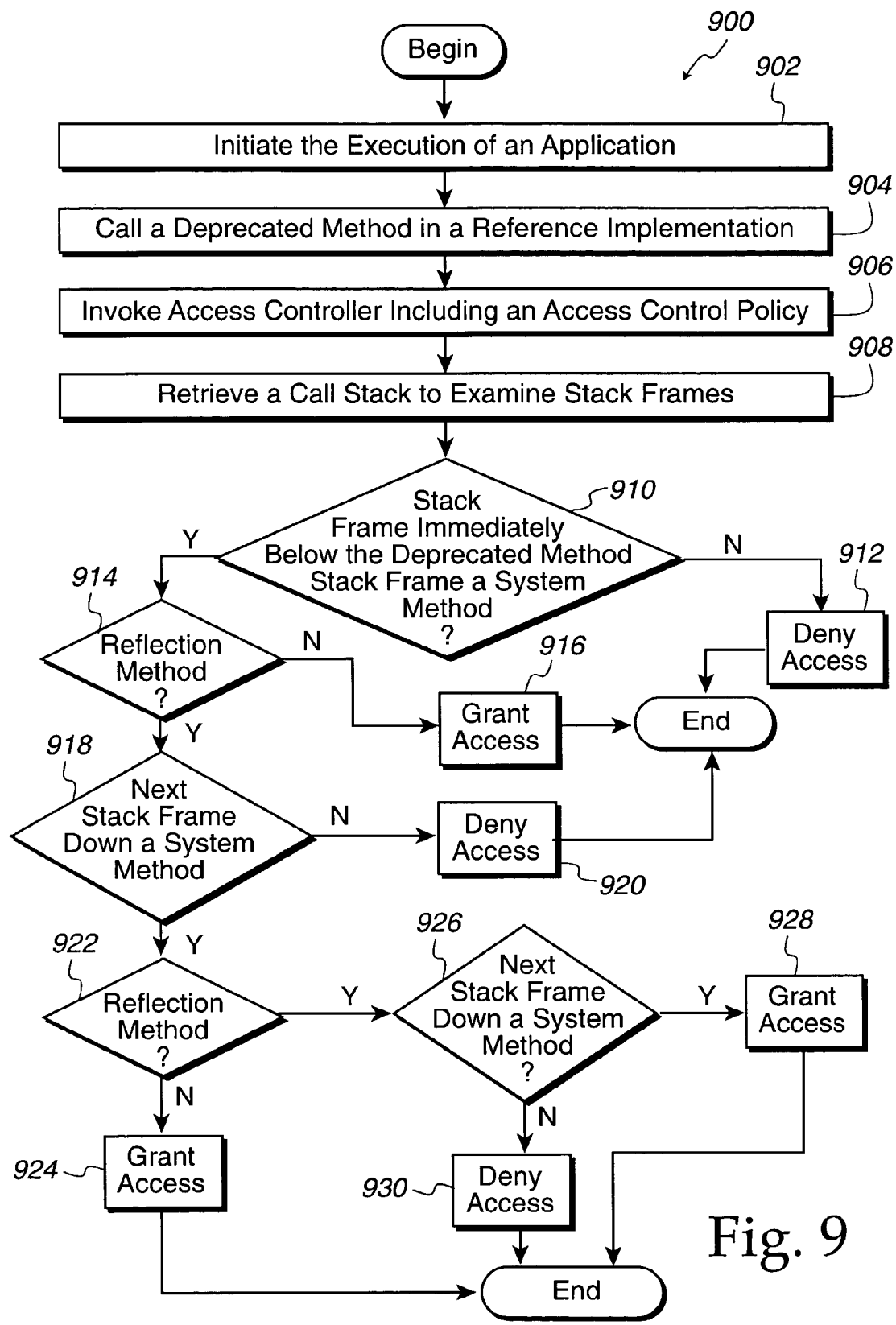
FIG. 9 is a flow chart diagram of the method operations performed in allowing access to a deprecated method using a call stack, according to yet another embodiment of the present invention.

FIG. 9 shows a flow chart 900 illustrating the method operations performed in allowing access to a deprecated method using a call stack, in accordance to one embodiment of the present invention. The method begins in operation 902 in which the execution of an application is initiated followed by operation 904 in which a deprecated method in a reference implementation is called. Next, in operation 906, an access controller that includes an access control policy is invoked. In one example, the access control policy is pluggable, which in one embodiment, halts the execution of the application upon calling of a deprecated method, while in a different embodiment creates a log of the deprecated method calls for future correction.

In operation 908, a call stack is retrieved so as to examine the stack frames. In one instance, each stack frame corresponds to a class and a method. The call stack is filled gradually, as each method in a class is called, with the first class and method filling substantially the first stack frame and the last class and method filling the last stack frame.

Moving to operation 910, a determination is made as to whether the stack frame immediately below the deprecated method stack frame is a system call. If the stack frame immediately below the deprecated method stack frame is not a system call, in operation 912, access is denied. However, if the stack frame immediately below the deprecated method stack frame is a system call, the method continues to operation 914 in which it is determined whether the stack frame immediately below the deprecated method stack frame is a reflection method. In one example, the reflection method can be invoke(). If it is determined that the stack frame immediately below the deprecated method stack frame is not a system call, in operation 916, access is granted to the system call.

Alternatively, if it is determined that the stack frame immediately below the deprecated method stack frame is a reflection method, the operation continues to operation 918 in which it is decided whether the next stack frame down the stack frame immediately below the deprecated method stack frame is a system call. If it is determined that the next stack frame down is not a system method, in operation 920, access is denied to the method. However, if it is determined that the next stack frame down is a system method, in operation 922, a decision is made as to whether the next stack frame down is a reflection method. If it is not a reflection method, the access is granted in operation 924. But, if the next stack frame down is a reflection method, the method continues to operation 926 in which a determination is made as to whether the next stack frame down the second reflection method is a system method. If the next stack frame down is a system method, in operation 928, access is granted, otherwise in operation 930, access is denied.

The advantages of the present invention are numerous. Most notably, in contrast to the prior art, the embodiments of the present invention are capable of detecting deprecated methods and classes during run time. In this manner, the embodiments of the present invention eliminate the problems of legacy, reflection, inheritance, and user careless associated with the prior art. Another advantage of the embodiments of the present invention is that the present invention implements an access controller to limit access to deprecated methods and classes in a reference implementation. Yet another advantage of the present invention is that the access controller limits access to the deprecated methods and classes using a set of criteria of an access control policy. Still another advantage of the present invention is that the access control policy of the present invention is pluggable, thus allowing the use of a diverse set of criteria in limiting access to the deprecated methods and classes.

With the above embodiments in mind, it should be understood that although in certain embodiment, the application has been disclosed to be the TCK, the embodiments of the present invention can be implemented to detect the accessibility of any application to a deprecated method or class (e.g., any JAVA application, etc.). Additionally, it must be understood, that although the embodiments of the present invention have been described using a reference implementation, in a different embodiment, any appropriate type of software including deprecated methods and elements can be implemented.

Furthermore, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter, be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for controlling access to deprecated methods of an implementation, comprising:
   receiving a request to access a method that has been marked as deprecated;
   building a call stack for the request;
   inspecting the call stack to determine if the request is from an application outside of the implementation; and
   denying access to the method if the request is determined to be from the application outside of the implementation upon the inspection;
   wherein inspecting the call stack to determine if the request is from the application outside of the implementation includes,
      moving through the call stack starting from the method;
      bypassing an intervening reflection method if a reflection method separates the method and the request;
      locating the request in the call stack; and
      determining whether the request is from the application outside of the implementation.

2. The computer-implemented method as recited in claim 1, wherein determining whether the request is from the application outside of the implementation includes,
   determining whether the request has a domain identical to a domain of the method.

3. The computer-implemented method as recited in claim 1, wherein the application outside of the implementation is a test and compatibility kit ("TCK").

4. A computer-implemented method for controlling access to deprecated methods of an implementation, comprising:

receiving a request to access a method that has been marked as deprecated;

building a call stack for the request;

inspecting the call stack to determine if the request is from an application outside of the implementation, such that inspecting the call stack includes moving through the call stack starting from the method and bypassing an intervening reflection method if a reflection method separates the method and the request; and acting on the request in accordance with a control policy defined by a pluggable policy;

wherein the pluggable policy denies access to the request if the request is determined to be from outside of the implementation upon the inspection and the request is determined to be outside of the implementation if a domain of the request differs from the domain of the method, and the request is determined to be outside of the implementation if the requests is a non-system request.

5. The computer-implemented method as recited in claim 4, wherein a change in the pluggable policy defines a new control policy for acting on the request.

6. A computer-implemented method for allowing access to a deprecated element of a software implementation, the method comprising:

invoking the deprecated element of the software implementation by a caller element;

invoking an access controller, the access controller including a pluggable access control policy; and determining an accessibility of the deprecated element by the caller element using the pluggable access control policy, the determining including, granting access to the caller element if the caller element satisfies a criteria of the access control policy; and denying access to the caller element if the caller element fails to satisfy the criteria of the access control policy;

wherein the criteria of the access control policy is allowing access to the caller element if the caller element has a domain identical to the domain of the software implementation, and wherein a plurality of stack frames of a call stack are built in successive order, as the deprecated element, an intervening element, and the caller element are invoked, and bypassing an intervening element if a reflection element separates the deprecated element.

7. A computer-implemented method for determining an accessibility of a caller element to a deprecated method of a software implementation, the method comprising:

invoking an access controller, the access controller including a pluggable access control policy configured to deny access to the caller element having a domain different than the domain of the software implementation; and limiting access to the deprecated method using the access control policy, wherein limiting access to the deprecated method using the access control policy includes, allowing the caller element access to the deprecated method if the domain of the caller element is identical to the domain of the software implementation; and denying the caller element access to the deprecated method if the domain of the caller element differs from the domain of the software implementation, and moving through a call stack starting from the method, bypassing an intervening element if a reflection element separates the deprecated method.

8. The computer-implemented method of claim 7, wherein the domain of the caller element is identical to the domain of the software implementation if the caller element is an element of the software implementation.

9. The computer-implemented method of claim 7, wherein the domain of the caller element differs from the domain of the software implementation if the caller element is an element of a software application.

10. The computer-implemented method of claim 8, wherein the software application is a test and compatibility kit ("TCK").

* * * * *